United States Patent
Ali et al.

(10) Patent No.: US 6,292,474 B1
(45) Date of Patent: Sep. 18, 2001

(54) MULTI-FREQUENCY BAND NYKTU-MODE RADIO RECEIVER AND ASSOCIATED METHOD HAVING SHARED CIRCUIT ELEMENTS

(75) Inventors: Fazal Ali; Thomas C. Wakeham; Konstantina A. Rovos, all of San Diego, CA (US)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/317,660

(22) Filed: May 24, 1999

(51) Int. Cl.[7] .............................. H04J 13/00; H04Q 11/00
(52) U.S. Cl. ......................... 370/328; 370/335; 455/74; 455/143
(58) Field of Search ................................. 370/328, 465, 370/329, 335, 342; 455/74, 142, 143

(56) References Cited

U.S. PATENT DOCUMENTS

| | | | |
|---|---|---|---|
| 5,794,159 | 8/1998 | Portin | 455/553 |
| 6,006,080 | 12/1999 | Kato et al. | 455/323 |
| 6,014,571 | 1/2000 | Enoki | 455/550 |
| 6,064,255 | 5/2000 | Tomiyama | 329/341 |

FOREIGN PATENT DOCUMENTS

| | | |
|---|---|---|
| 19705752 | 10/1997 | (DE) . |
| 0813312 | 12/1997 | (EP) . |
| 0823788 | 2/1998 | (EP) . |
| 0823790 | 2/1998 | (EP) . |
| WO 97/30523 | 8/1997 | (WO) . |

*Primary Examiner*—Melvin Marcelo
(74) *Attorney, Agent, or Firm*—Milan I. Patel (57) ABSTRACT

Apparatus, and an associated method, for radio receiver circuitry operable in multi-modes to receive signals generated during operation of a multiple number of radio communication systems. The receiver circuitry is divided into receive chain portions which are selectably utilized depending upon which of the multiple number of the radio communication systems in which communications are to be effectuated. Selected combinations of the receive chain portions are formed, depending upon which of the modes in which the receiver circuitry is to be operable. Different combinations of the receive chain portions permit sharing of receive chain portions thereby to reduce the required number of circuit elements to form the multi-mode receiver circuitry. In one implementation, the radio receiver circuitry forms the receive portion of a dual-band, tri-mode mobile station operable in a selected one of three different cellular communication systems.

16 Claims, 4 Drawing Sheets

| *FIG. 2A* | *FIG. 2B* |

MULTI-FREQUENCY BAND NYKTU-MODE RADIO RECEIVER AND ASSOCIATED METHOD HAVING SHARED CIRCUIT ELEMENTS

The present invention relates generally to a radio device, such as a multi-mode mobile station selectively operable in more than one mobile communication system. More particularly, the present invention relates to a multi-mode radio receiver and an associated method, in which circuitry portions required for operation of the radio receiver in its different modes of operation are shared. By sharing the circuitry portions, cost-savings and size-savings are achieved.

BACKGROUND OF THE INVENTION

Information is communicated in a communication system between two or more communications stations. Information which is to be communicated between the communication stations is transmitted upon a communication channel formed to extend between the communication stations. In a two-way communication system, a communication station includes both a transmitter and a receiver operable to transmit and to receive, respectively, communication signals. Thereby in a two-way communication system, information is both transmitted and received at a single communication station.

A radio communication system is a communication system in which the communication channel formed between the communication channels is a radio channel defined upon a portion of the electromagnetic spectrum.

A radio communication system inherently increases communication mobility as communication channels defined in such a system are formed of radio channels and do not require wireline connections to form the communication channels. A radio communication system, however, typically is bandwidth-limited. That is to say, regulatory bodies which allocate usage of the electromagnetic spectrum allocate only a limited amount of the electromagnetic spectrum for communications in a particular radio communication system. Because the spectrum allocation for use by a particular system is limited, communication capacity increase of a radio communication system is limited by such allocation. Efforts are made, therefore, to construct a radio communication system in manners which efficiently utilize the allocated spectrum.

A PCS, or other mobile communication system is exemplary of a radio communication system. Mobile communication systems make relatively efficient use of the spectrum allocated thereto. Signals generated during operation of the mobile communication system are of relatively low power levels. Because of the use of low-power signals, the same channels can be reused throughout a mobile communication system according to a cell reuse plan. Concurrent use of the same channels is permitted according to the cell reuse plan, thereby to effectuate concurrent communications on the same channels by different communication station pairs at different locations throughout the area encompassed by the mobile communication system.

However, even with the relatively efficient utilization of the allocated spectrum, many mobile communication systems have been operated at their maximum capacities, particularly at certain-times-of-day and within certain cells of the mobile communication system. With technological advancements and the need to address the capacity problems of conventional mobile communication systems, various mobile communication systems have been developed which permit increased capacities of communication therein.

In many instances, the mobile communication systems of such increased capacities require the installation of separate network infrastructures and the construction of separate mobile stations to be operable to communicate therewith. The separate network infrastructure are commonly overlaid upon existing mobile communication systems. And, mobile systems constructed according to different communication standards have been installed also in non-overlapping geographical areas. That is to say, different types of mobile communication systems are installed in different geographical areas. A mobile station operable pursuant in only one of the systems is operable only in the geographical area encompassed by such system.

Dual-mode mobile stations, for instance, are available to permit a user to communicate alternately by way of two different mobile communication systems. More generally, multi-mode mobile stations have been developed to permit their operation in multiple different mobile communication systems. Such dual- and multi-mode mobile stations typically must include circuitry specifically constructed for each of the different mobile communication systems in which the mobile station is operable. The various communication systems, for instance, are operable at different frequency bands, with different modulation schemes, with different coding schemes, etc. Therefore, conventional dual- and multi-mode mobile stations are sometimes to include separate, but functionally redundant, circuit paths for each of the communication systems in which the mobile station is to be operable.

Such duplication increases the complexity of the mobile station as well as the costs of the mobile station. And, because the redundant circuit paths each require separate circuit elements, the physical size of the resultant mobile station increases.

However, different ones of the mobile communication system standards sometimes exhibit some commonalities. For instance, the same modulation schemes are utilized but at different frequency ranges. Or, different modulation schemes might be utilized in the different communication systems but at the same range of frequencies.

For instance, an analog system such as AMPS (Advanced Mobile Phone System) is operable at a frequency range located about 800 MHz and utilizes an FDMA (Frequency Division Multiple Access) method. This system utilizes frequency modulation techniques to modulate information which is to be communicated during its operation. A digital systems such as PCS (Personal Communication System) which is operable at a frequency range of about 1.9 GHz utilizes various access methods, including a CDMA (code division, multiple-access). CDMA systems generally utilize QPSK (Quadrature Phase Shift Keying) modulation technique. Therefore, this same modulation technique is also utilized for CDMA systems operable at the cellular band of frequencies, i.e., the range located at about 800 MHz.

If advantage could be taken of the commonality of the different systems in which a multi-mode mobile station is to be operable, sharing of circuitry portions of the different circuit branches could be made. Such sharing would reduce the cost of the mobile station, along with permitting a reduction in the physical dimensions of the resultant mobile station.

It is in light of this background information related to radio devices, such as mobile stations operable in mobile communication systems, that the significant improvements of the present invention have evolved.

SUMMARY OF THE INVENTION

The present invention, accordingly, advantageously provides a manner by which to share circuitry portions required for operation of a multi-mode radio receiver. Circuitry portions, which conventionally form separate circuit chain portions, are shared in an embodiment of the present invention. By sharing the circuitry portions, the radio receiver is of less costly construction. And, because sharing of the circuitry portions results in a reduction of parts required of the radio receiver, a reduction in the physical dimensions required of the radio receiver is also provided.

In one aspect of the present invention, radio-frequency receive chain portions are used to act upon first receive signals and second receive signals generated during operation of a first mobile communication system and a second mobile communication system, respectively. The first and second mobile communication systems are operable over a common frequency band, thereby to permit the RF receive chain portion to be shared, operable to receive either the first receive signal or the second receive signal.

In another aspect of the present invention, a lower-frequency receive chain portion, for example, an IF (intermediate frequency) level or baseband level receive chain portion, is operable alternately to act upon indications of a first receive signal generated during operation of a first mobile communication system and a second receive signal generated during operation of a second mobile communication system. The first and second mobile communication systems are operable pursuant to a common modulation scheme, thereby to permit the lower-frequency receive chain portion to be used to act upon the indications of either the first or the second radio signals.

In yet another aspect of the present invention, a radio receiver of a trimode radio device is provided. The radio receiver is operable to receive and to act upon, a first radio signal generated by a first radio communication system, a second radio signal generated by a second radio communication system, and a third radio signal generated by a third mobile communication system. An RF receive chain portion is operable to act upon the radio signals generated by at least two of the radio communication systems. Thereby, a reduction in the required number of RF receive chain portions required of the tri-mode device is reduced. In analogous manner, a lower-frequency receive chain portion is selectively operable to act further upon indications of a receive signal generated by more than one of the radio communication systems. Thereby, the required number of lower-frequency, receive chain portions required of the tri-mode device is also reduced.

In an exemplary implementation, a dual-frequency band, tri-mode mobile station is provided. The mobile station is selectably operable in a PCS-CDMA communication system, an AMPS system, and a cellular-CDMA system. A first, RF receive chain portion is operable to act upon receive signals generated during operation of the PCS-CDMA system. The first, RF receive chain portion is operable also to down-convert such signal to an IF frequency. A second receive chain portion is operable to receive and to act upon receive signals generated during operation of the cellular-CDMA system and the AMPS system. The second RF receive chain portion is operable also to down-convert in frequency receive signals acted upon thereat to an IF frequency. Because the second RF receive chain portion acts upon signals generated during operation of two separate systems, a reduction in circuitry relative to conventional constructions of such a mobile station is achieved. The mobile station further includes a common receive chain portion coupled to both the first and second RF receive chain portions. The common receive chain portion acts upon indications of a selected one of the receive signals applied to, and acted upon, the first and second RF receive chain portions. The common receive chain portion includes a CDMA demodulator to demodulate the signals generated, alternatively, by the PCS-CDMA system and the cellular-CDMA system. Because the common receive chain portion acts upon signals generated by two separate communication systems, a reduction in circuitry is again achieved. The mobile station further includes a third receive chain portion coupled to the second RF receive chain portion, and selectably operable to act upon indications of the receive signal generated during operation of the AMPS system.

In yet another aspect of the present invention, biasing and switching circuitry is shared between the first and second RF receive chain portions. Because only one or the other of the RF receive chain portions is selected to be operable at a particular time period, such biasing and switching circuitry need only be coupled to the operable one of the RF receive chain portions. Additional reduction in circuitry required of the mobile station is thereby further achieved.

In these and other aspects, a multi-mode radio receiver, and an associated method is provided. The multi-mode radio receiver is operable to receive first receive signals generated during operation of a first radio communication system and to receive at least second receive signals generated during operation of at least a second radio communication system. A first receive chain portion has a front end side and a back end side. The front end side of the first receive chain portion is coupled to receive indications of the first receive signal. The first receive chain portion is selectably operable to act upon the indications of the first receive signal. A second receive chain portion has a front end side and a back end side. The front end side of the second receive chain portion is coupled to receive indications of the second receive signal. The second receive chain portion is selectably operable to act upon the indications of the second receive signal. Either one, but not both, of the first receive chain portion and the second receive chain portion are selected to be operable during a selected period. A common receive chain portion is coupled both to the back end side of the first receive chain and to the back end side of the second receive chain. The common receive chain acts further upon a selected one of the indications of the first receive signal and the indications of the second receive signal. The selected one corresponds to which of the first receive chain portion and the second receive chain portion is selected to be operable during the selected period.

A more complete appreciation of the present invention and the scope thereof can be obtained from the accompanying drawings which are briefly summarized below, the following detailed description of the presently-preferred embodiments of the present invention, and the appended claims.

DETAILED DESCRIPTION OF THE PREFERRED EMBODIMENT

Figure 1:
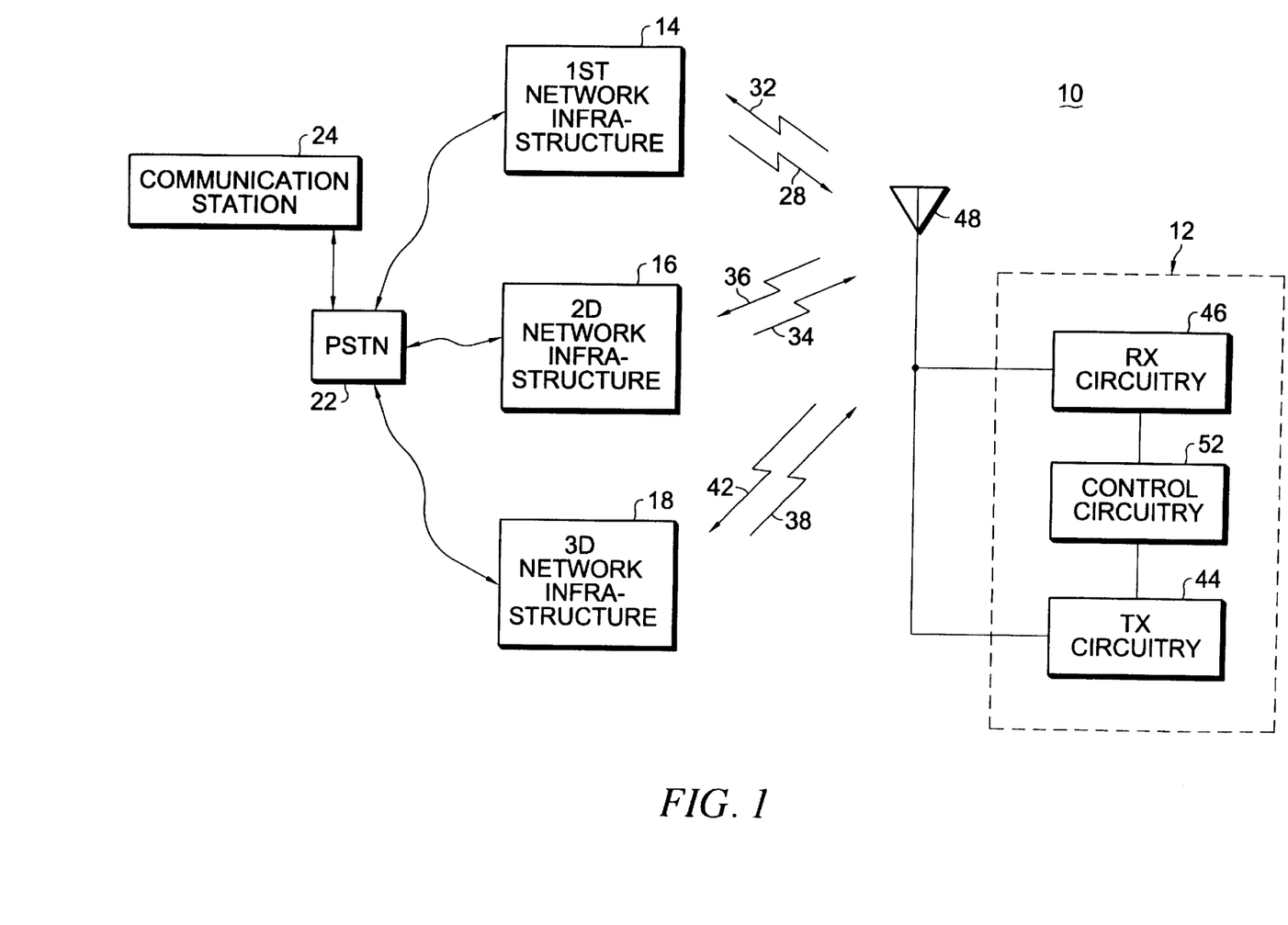
FIG. 1 illustrates a functional block diagram of a mobile station of an embodiment of the present invention positioned to transceive communication signals in three separate radio communication systems.

Referring first to FIG. 1, a communication arrangement, shown generally at 10, includes a multi-mode mobile station 12 capable of transceiving communication signals with a plurality, here three, radio communication systems. In the exemplary implementation, the mobile station 12 forms a dual-band, tri-mode, cellular mobile station selectably operable in three separate mobile communication systems. While the following description shall describe the mobile station 12 with respect to such an implementation, it should be understood that other embodiments of the present invention can analogously be implemented to be operable in other types of communication systems.

Three separate network infrastructures, a first network infrastructure 14, second network infrastructure 16, and a third network infrastructure 18 are installed and are permitting of radio communications with the mobile station 12 when the mobile station is positioned in a geographical area encompassed by the network infrastructure of the respective communication systems. The separate network infrastructures may be overlaid, or partially overlaid, upon one another. Or, the network infrastructure may be installed at separate geographical areas, and the mobile station communicates with the respective one of the separate radio communication systems when the mobile station is positioned in the geographical area encompassed by such respective communication system.

The network infrastructure 14 is here representative of a PCS-band, CDMA (code division, multiple-access) mobile communication system operable at approximately 1.9 GHz. The network infrastructure 16 is representative of a cellular-band, CDMA mobile communication system operable at about 800 MHz. And, the network infrastructure 18 is representative of the network infrastructure of a cellular-band, AMPS (advanced mobile phone service) mobile communication system operable also at about 800 MHz. It should be noted that the terminology of cellular and mobile shall be, at times, used interchangeably herein.

The network infrastructure 14–18 of the respective communication systems are coupled to a PSTN (public-switched, telephonic network) 22, in conventional manner. A communication station 24 is also shown to be coupled to the PSTN. The communication station 24 is exemplary of a communication station with which communications can be effectuated with the mobile station.

During operation of the first cellular communication system, communication signals are transceived between the network infrastructure 14 and the mobile station. Here, first downlink communication signals 28 and first uplink signals 32 are representative of the signals communicated between the network infrastructure and the mobile station. Analogously, during operation of the second cellular communication system, communication signals are transceived between the network infrastructure 16 and the mobile station 12. Here, second downlink communication signals 34 and second uplink communication signals 36 are representative of communication of the signals between the network infrastructure and the mobile station. And, during operation of the third cellular communication system, communication signals are transceived between the network infrastructure 18 and the mobile station 12. Here, third downlink communication signals 38 and third uplink communication signals 42 are representative of signals communicated during operation of the third cellular communication system.

The mobile station 12 is here shown to include transmitter circuitry 44 and receiver circuitry 46. Information sourced at the mobile station is acted upon by the transmitter circuitry and transduced by an antenna transducer 48 to form, selectably, the uplink communication signals, 32, 36, and 42, as appropriate. And, when any of the first, second and third downlink communication signals 28, 34, and 38 are detected at the transducer 48 and converted in electrical form to be applied to the receiver circuitry 46, the receiver circuitry is selectably operable to act upon the signals applied thereto.

The mobile station 12 is further shown to include control circuitry 52 operable to control operation of the transmitter and receiver circuitry 44 and 46, respectively. The control circuitry controls operation of the respective circuitry to cause operation of the mobile station in a selected one of the different cellular communication systems with which the mobile station 12 is operable. By appropriate control over which of the communication systems with which the mobile station is operable, an available one, or a desired one, of the cellular communication systems, is caused to be utilized by the mobile station.

Figure 2:
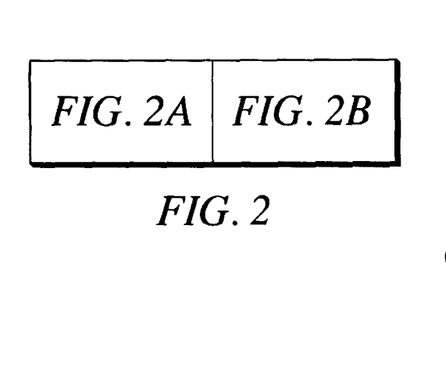
FIG. 2 illustrates a functional block diagram of a portion of the mobile station shown in FIG. 1 of an embodiment of the present invention.
Figure 2A:
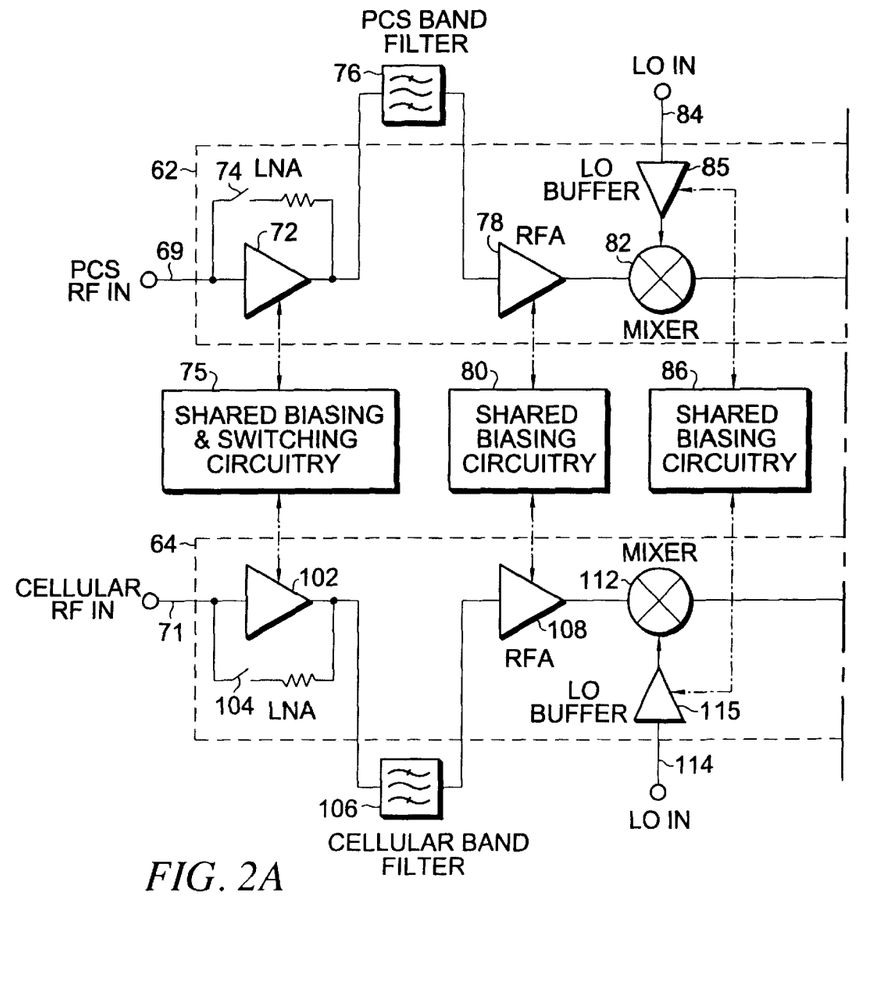
Figure 2B:
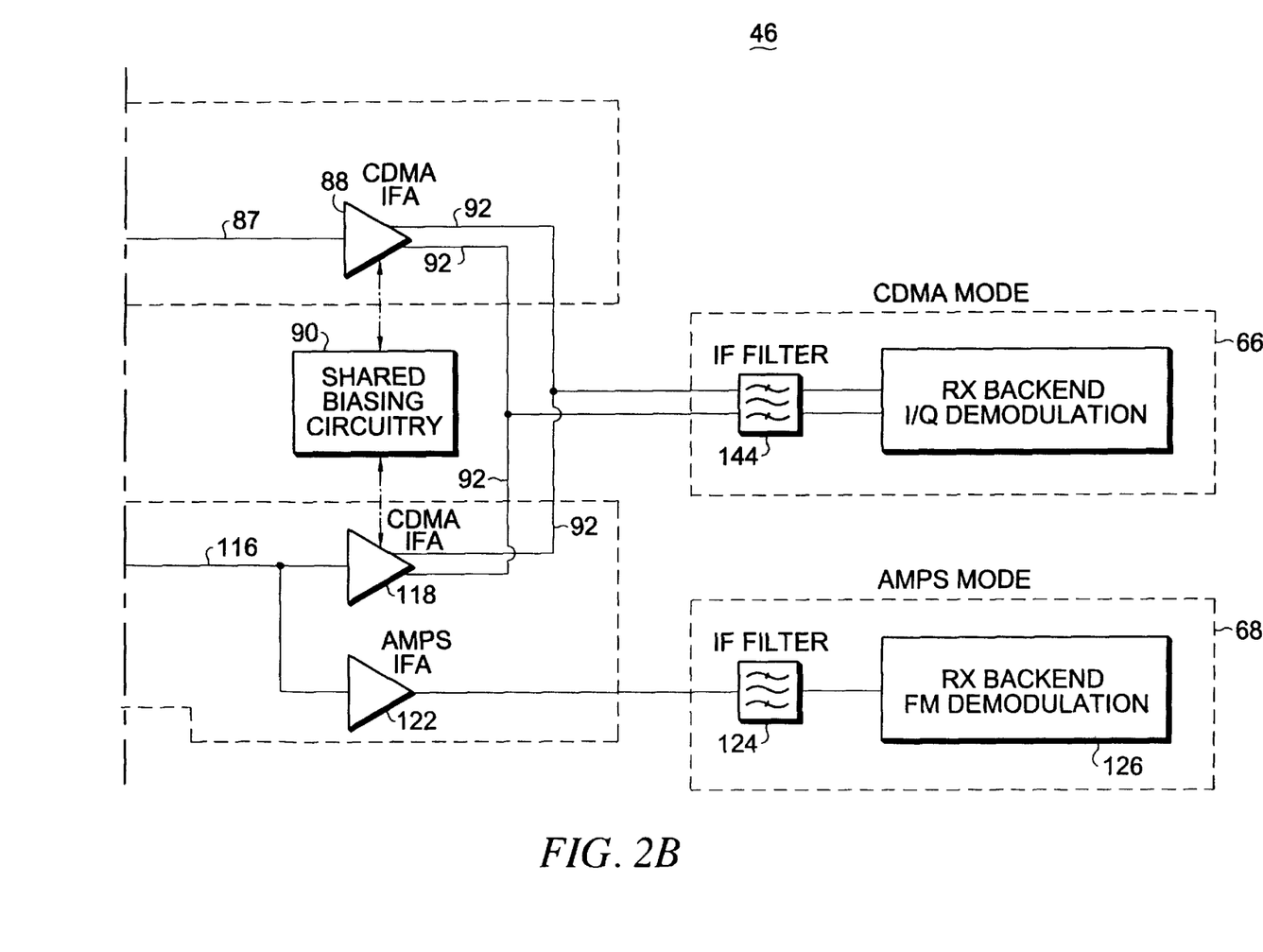

FIG. 2 illustrates the receiver circuitry 46 of an embodiment of the present invention. In the exemplary implementation, the receiver circuitry 46 forms a portion of the mobile station 12 of a dual-band, tri-mode mobile station. While the circuitry 46 of the exemplary implementation shown in the Figure is representative of the circuitry of such a device, in other implementations, the receiver circuitry is alternately configured to be operable in selected communication systems, as appropriate.

The receiver circuitry 46 here includes a first receive chain portion 62, a second receive chain portion 64, a common receive chain portion 66, and a third receive chain portion 68.

The first receive chain portion 62 includes a front end side coupled to the antenna transducer 48 (shown in FIG. 1), thereby to receive indications of the first downlink communication signal 28 (shown in FIG. 1), when detected at the mobile station of which the receiver circuitry forms a portion. The indications are applied to the portion 62 on the line 69, here indicated as "PCS RF In." Analogously, the second receive chain portion 64 also includes a front end side, also coupled to the antenna transducer (shown in FIG. 1), thereby to receive indications of the second downlink communication signal 34 (shown in FIG. 1). The indications are applied to the portion 64 on the line 71, here indicated as "CELLULAR RF In." The first and second receive chain portions 62 and 64 further define back end sides to which the common receive chain portion 66 is coupled. The first and second receive chain portions are coupled to the common receive chain portion in a wired-OR configuration in which indications of either the first receive signal, once acted upon by the first receive chain portion, or indications of the second receive chain portion once acted upon by the second receive chain portion are provided to the common receive chain portion to be acted further upon thereat.

The third receive chain portion 68 is also coupled to the back end side of the second receive chain portion 64 and is selectably operable, alternate to operation of the common receive chain portion.

The first receive chain portion 62 forms an RF (radio frequency)-stage of a PCS-band receive operable at about 1.9 GHz. Indications of the first receive signal, detected at the antenna transducer 48 and converted into electrical form thereat, are provided to a low-noise amplifier (LNA) 72. The LNA 72 is a switched amplifier which permits bypassing of the amplifier if determinations are made that amplification at the LNA is unnecessary. Such switching is performed by a switch element 74. Selection of the switch position of the switch element 74 is made by biasing and switching circuitry 75 to position the switch element 74 in a desired switch position. The LNA 72 is coupled to a PCS-band filter 76 which has a passband to pass signal frequency within the PCS passband. Signal frequencies passed by the filter 76 are applied to an RF amplifier 78 to be amplified thereat. The amplifier 78 is biased by shared biasing circuitry 80. Once amplified, the signal is provided to a first input of a mixer 82. A down mixing signal, the "LO In" signal, generated on the line 84 is applied to a second input of the mixer 82 by way of an isolating buffer 85. The buffer 85 is biased by shared biasing circuitry 86. The mixer operates as a down-mixer to down-convert in frequency the amplified signal applied to the first input of the mixer to form an IF (intermediate frequency)-frequency signal on the line 87 extending from an output of the mixer. The IF signal is applied to an IF-stage amplifier 88, here a differential amplifier. The amplifier is biased by shared biasing circuitry 90. Differential, amplified signals are generated on the lines 92, and the lines 92 are connected to the common receive chain portion 66.

The second receive chain portion 64 forms an RF-stage of a cellular-band receiver operable at cellular frequencies of about 800 MHz. Indications of the second downlink signals detected at the antenna transducer 48 and converted into electrical form thereat are applied to an input of a low-noise amplifier (LNA) 102. The LNA 102 is a switched amplifier which permits bypassing of the amplifier if determinations are made that amplification at the LNA is unnecessary. Such switching is performed by a switch element 104. Selection of the switch position of the switch element 104 is made by the shared biasing and switching circuitry 75. The LNA 102 is coupled to a cellular band filter 106 having a passband to pass signal frequencies within a cellular band of approximately 800 MHz. Signal frequencies passed by the filter 106 are amplified by an RF amplifier 108. The amplifier 108 is biased by biasing circuitry 80. Amplified signals are applied to a first input of a mixer 112. A down-mixing signal, the "LO In" signal, generated on the line 114 is applied to a second input of the mixer 112 by way of an isolating buffer 115. The buffer 115 is biased by shared biasing circuitry 86. The mixer 112 is operable to down-convert the indications of the second receive signal applied to the first input of the mixer in frequency to an IF frequency. An IF signal is formed on the line 116 at an output of the mixer 112. The line 116 is coupled to an input of a differential amplifier 118 operable to generate amplified signals on the line 92. The amplifier is biased by the shared biasing circuitry 90. The lines 92 are connected to the common receive chain portion 66.

The line 116 is also coupled to an input of an amplifier 122. The amplifier 122, an output line of which is coupled to the third receive chain portion 68. The amplifier is selectably operable to amplify the IF signal formed on the line 116 and to apply such signal, once amplified, to an IF filter 124. Signal frequencies within the passband of the filter 124 are applied to a receiver backend FM Demodulation element 126. The element 126 performs functions such as baseband down conversion and demodulation operations. The FM demodulation can be performed by digital or analog methods.

The lines 92, connected to the differential outputs of the IF amplifiers 88 and 118 of the first and second receive chain portions 62 and 64, respectively, are coupled to an IF filter 144 which forms a portion of the common receive chain portion 66. The filter 144 exhibits a passband corresponding to the passband to pass signal frequencies of CDMA signals generated during operation of a cellular, CDMA system, either of those operable at a PCS-band frequency or operable at a cellular-band frequency. Signal frequencies passed by the filter 144 are applied to a receiver backend I/Q Demodulation element 146. The element 146 performs functions such as baseband down conversion and demodulation operations.

The receiver circuitry 46 shown in the Figure is of reduced circuit element count relative to conventional such constructions because circuit paths are shared amongst the circuit paths required for operation of the different mode of which the mobile station is operable. Advantage is taken of the fact that the mobile station is operable in a single mode at a time. That is to say, when the mobile station is operable to communicate pursuant to the first communication network, here a PCS-band, CDMA system, only the circuit path relating to that communication system is operable. In one implementation, the IF-stage amplifiers 88, 118, and 122, are selectably powered. Such selective powering of the amplifiers is determinative of operation of the receiver circuitry.

When the mobile station of which the receiver circuitry forms a portion is to be operable in a PCS-band, CDMA mode, the IF-stage amplifier 88 is powered while the amplifiers 118 and 122 are not powered. Thereby, a receive chain, formed of the receive chain portion 62 and the common receive chain portion 66 acts upon signals received at the mobile station. When, conversely, the mobile station is to be operable in the cellular-band, CDMA mode, the amplifier 118 is caused to be powered while the amplifiers 88 and 122 are caused not to be powered. Thereby, the second receive chain portion 64 and the common receive chain portion 66 form a receive chain which acts upon the signals received at the mobile station. And when the mobile station is to be operated in a cellular-band, AMPS mode, the amplifier 122 is caused to be powered, and the amplifiers 88 and 118 are caused not to be powered. Thereby, the second receive chain portion 64 and the third receive chain portion 68 form a receive chain for acting upon signals received at the mobile station. In other implementations, other manners are used by which to selectably connect the different portions 62, 64, 66, and 68 to form a receive chain, operable as desired. In similar manner, the shared circuitry 75, 80, 86, and 90 is operable with a selected one of the first receive chain portion with a second receive chain portion. Circuit element-count is thereby reduced, relative to conventional constructions of the receiver circuitry 48.

Figure 3:
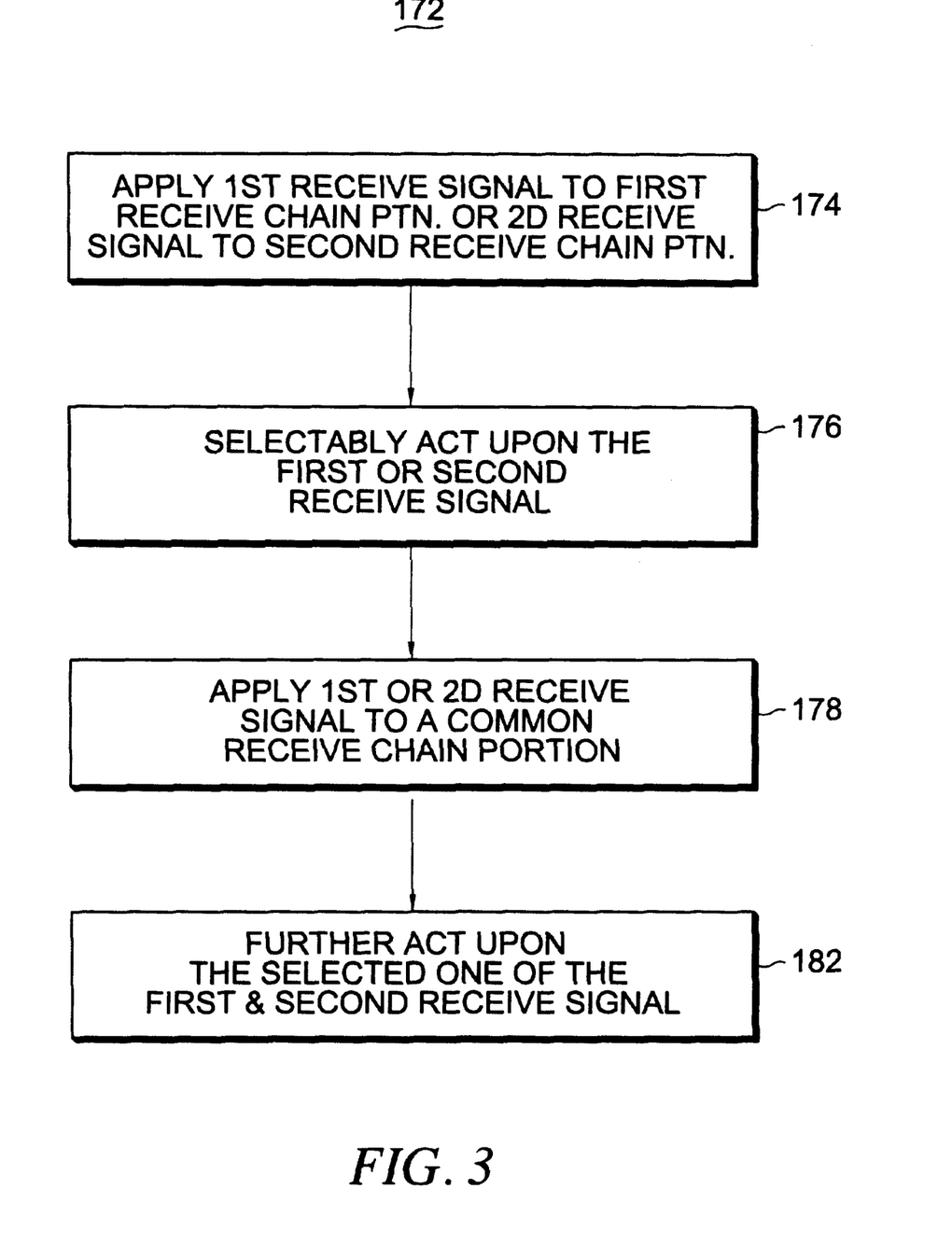
FIG. 3 illustrates a method flow diagram listing the method of operation of an embodiment of the present invention.

FIG. 3 illustrates a method, shown generally at 172, of an embodiment of the present invention. The method selectably acts upon a first receive signal and at least a second receive signal when received at a multimode radio receiver operable to receive first receive signals generated during operation of a first radio communication system and to receive at least second receive signals generated during operation of at least a second radio communication system.

First, and as indicated by the block 174, indications of the first receive signal, if received at the multi-mode receiver, are applied to a first receive chain portion. And, indications of the second receive signal, if received at the multi-mode receiver, are applied to a second receive chain portion.

Then, and as indicated by the block 176, the indications of the first receive signal are selectably acted upon at the first receive chain portion, and the indications of the second receive signal are selectably acted upon at the second receive chain portion. Either one, but not both, of the first receive chain portion and the second receive chain portion are operable during the selected period.

Then, and as indicated by the block 178, indications of a selected one of the indications of the receive signal and the indication of the second receive signal are applied to a common receive chain portion. And, as indicated by the block 182, the indications of the selected one of the indications of the first and second receive signal, applied to the common receive chain portion are further acted upon.

The previous descriptions are of preferred examples for implementing the invention, and the scope of the invention should not necessarily be limited by this description. The scope of the present invention is defined by the following claims.

We claim:

1. A multi-mode radio receiver operable to receive first receive signals generate during operation of a first radio communication system and to receive at least second receive signals generated during operation of at least a second radio communication system, said multi-mode radio receiver comprising:

a first receive chain portion having a front end side and a back end side, the front end side of said first receive chain portion coupled to receive indications of the first receive signal, said first receive chain portion having at least a first amplifier, the first amplifier selectably biased to cause said first receive chain portion to act upon the indications of the first receive signal;

a second receive chain portion having a front end side and a back end side, the front end side of said second receive chain portion coupled to receive indications of the second receive signal, said second receive chain portion having at least a second amplifier, the second amplifier selectably biased to cause said second receive chain portion to act upon the indications of the second receive signal, either one, but not both, of said first receive chain portion and said second receive chain portion selected to be operable during a selected period;

shared circuitry coupled to both said first receive chain portion and to said second receive chain portion, said shared circuitry alternately operable with said first receive chain portion to from a portion thereof and with said second receive chain portion to form a portion thereof, said shared circuitry including amplifier biasing and switching circuitry for biasing a selected one of the first amplifier and the at least the second amplifier; and a common receive chain portion coupled both to the back end side of said first receive chain portion and to the back end side of said second receive chain portion, said common receive chain portion for acting further upon a selected one of the indications of the first receive signal and the indications of the second receive signal, the selected one corresponding to which of said first receive chain portion and said second receive chain portion is selected to be operable during the selected period.

2. The multi-mode radio receiver of claim 1 wherein said first receive chain portion and said second receive chain portion each comprises an RF (radio frequency)-stage for acting upon the indications of the first receive signal and upon the indications of the second receive signal, respectively, when at radio frequencies, and wherein said common receive chain portion comprises an IF (intermediate frequency)-stage for acting upon the selected one of the indications of the first receive signal and of the second receive signal, respectively, when at intermediate frequencies.

3. The multi-mode radio receiver of claim 2 wherein said common receive chain portion further comprises an intermediate-stage for acting upon the selected one of the indications of the first receive signal and of the second receive signal, when at baseband frequencies.

4. The multi-mode radio receiver of claim 2 wherein the first receive signal is of a bandwidth within a first range of frequencies, wherein the second receive signal is of a bandwidth within a second range of frequencies, said first receive chain portion operable at the first range of frequencies, and said second receive chain portion operable at the second range of frequencies.

5. The multi-mode receiver of claim 4 wherein the first radio communication system comprises a first cellular communication system operable at the first range of frequencies according to a first modulation scheme, wherein the second radio communication system comprises a second cellular communication system operable at the second range of frequencies according also to the first modulation scheme, said first receive chain portion having a first down-converter for down-converting the indications of the first receive signal to an IF (intermediate frequency) range, and said second receive chain portion having a second down-converter for down-converting the indications of the second receive signal to the IF range.

6. The multi-mode receiver of claim 5 wherein said first amplifier further comprises a first IF amplifier for selectively amplifying the indications of the first receive signal once down-converted by the first down-converter to the IF range, wherein said second amplifier further comprises a second IF amplifier for selectively amplifying the indications of the second receive signal once down-converted by the second down-converter to the IF range, the first amplifier and the second IF amplifier alternately operable, and wherein the selected one of the indications of the first receive signal and the indications of the second receive signal upon which said common receive chain further acts upon is determined by which of the first IF amplifier and the second IF amplifier is operable.

7. The multi-mode receiver of claim 1 wherein the at least second receive signals generated during operation of the at least second radio communication system comprises the second receive signals generated during operation of the second radio communication system and at least third receive signals generated during operation of at least a third radio communication system, said second receive chain portion further selectably operable to act upon indications of the third receive signals, said multi-mode receiver further comprising a third receive chain portion coupled to the back end side of said second receive chain portion, said third receive chain portion selectably operable further to act upon the indications of the third receive signal, said third receive chain portion operable alternate to operation of said common receive chain portion.

8. The multi-mode receiver of claim 7 herein said second receive chain portion comprises an RF (radio frequency)-stage for selectably acting upon the second receive signal and the third receive signal, respectively, at radio frequencies, and wherein said third receive chain portion comprises an IF (intermediate frequency)-stage for selectably further operating upon the indications of the third receive signals at intermediate frequencies.

9. The multi-mode radio receiver of claim 8 wherein the first receive signal is of a bandwidth within a first range of frequencies, wherein the second receive signal is of a bandwidth within a second range of frequencies, and wherein the third receive signal is of a bandwidth also within the second range of frequencies, said first receive chain portion operable at the first range of frequencies, and said second receive portion operable at the second range of frequencies.

10. The multi-mode receiver of claim 9 wherein the first radio communication system comprises a first cellular communication system operable at the first range of frequencies according to a first modulation scheme, wherein the second radio communication system comprises a second cellular communication system operable at the second range of frequencies according also to the first modulation scheme, and wherein the third radio communication system comprises a third cellular communication system operable pursuant to a second modulation scheme, said first receive chain portion having a first down-converter for down-converting the indications of the first receive signal to an IF (intermediate frequency)-range and said second receive chain portion having a second down-converter for down-converting the indications of the second receive signal to the IF range.

11. The multi-mode receiver of claim 10 wherein the first cellular communication system comprises a CDMA (code division, multiple-access) system operable at a PCS (personal communication system) frequency range, wherein the second cellular communication system comprises a CDMA (code division, multiple-access) system operable at a cellular-band frequency range, and wherein the third cellular communication system comprises an AMPS (Advanced Mobile Phone Service) system operable at the cellular-band frequency range, said common receive chain portion having CMDA demodulation elements and said third receive chain portion having AMPS demodulation elements.

12. The multi-mode receiver of claim 10 wherein the first amplifier of said first receive chain portion further comprises a first IF amplifier for selectively amplifying the indications of the first receive signal once down-converted by the first down-converter, wherein the at least second amplifier of said second receive chain portion further comprises a second IF amplifier for selectively amplifying the indications of the second receive signal once down-converted by the second down-converter, and a third IF amplifier for amplifying the indications of third receive signal once down-converted by the second down-converter, a selected one of the first amplifier, the second amplifier, and the third amplifier operable during the selected period.

13. The multi-mode receiver of claim 12 wherein the second IF amplifier of said second receive chain portion includes a front end side coupled to the second down-converter and wherein the third IF amplifier of said third receive chain portion includes a front end side coupled to the second down-converter of said second receive chain portion.

14. The multi-mode receiver of claim 7 having a first integrated circuit element and a second integrated circuit element, said first receive chain portion disposed at said first integrated circuit element, and said first receive chain portion, said common receive chain portion, and said third receive chain portion disposed at said second integrated circuit element.

15. In a method for operating a multi-mode radio receiver operable to receive first receive signals generated during operation of a first radio communication system and to receive at least second receive signals generated during operation of at least a second radio communication system, an improvement of a method for selectively acting upon the first receive signal and the at least second receive signal when received at the multi-mode radio receiver, said method comprising:

applying indications of the first receive signal, if received at the multimode receiver, to a first receive chain portion and indications of the second receive signal, if received at the multi-mode receiver, to a second receive chain portion, the first receive chain portion having at least a first amplifier and the second receive chain portion having at least a second amplifier;

selectably biasing a selected one of the first amplifier and the second amplifier, thereby selectably to cause the indications of the first receive signal to be acted upon by the first receive chain portion and the indications of the second receive signal to be acted upon by the second receive chain portion, either one, but not both, of the first receive chain portion and the second receive chain portion operable during a selected period;

applying indications of selected one of the indications of the first receive signal and the indications of the second receive signal to a common receive chain portion, subsequent to actions performed thereon during said operation of selectably acting; and further acting upon the indications of the selected one of the indications of the first receive signal and the second receive signal, respectively, applied to the common receive chain portion.

16. The method of claim 15 wherein the multi-mode radio receiver is further operable to receive third receive signals generated during operation of a third radio communication system, wherein said operation of applying the indications of the first receive signal the first receive chain portion and the indications of the second receive signal portion to the second receive chain portion further comprises applying indications of the third receive signals, if received at the multi-mode receiver, to the second receive chain portion, wherein the second receive chain portion further has a third amplifier and wherein said operation of selectably biasing further comprises selectably biasing the third amplifier, thereby further selectably to cause the indications of the third receive signal at the second receive chain portion.

* * * * *

UNITED STATES PATENT AND TRADEMARK OFFICE
CERTIFICATE OF CORRECTION

PATENT NO. : 6,292,474 B1
DATED : September 18, 2001
INVENTOR(S) : Fazal Ali, et al.

It is certified that error appears in the above-identified patent and that said Letters Patent is hereby corrected as shown below:

<u>Title page,</u>
Item [54], Delete "NYKTU-MODE " and insert -- MULTI-MODE --.

Signed and Sealed this

Twenty-eighth Day of May, 2002

Attest:

JAMES E. ROGAN
*Attesting Officer*        *Director of the United States Patent and Trademark Office*

UNITED STATES PATENT AND TRADEMARK OFFICE
CERTIFICATE OF CORRECTION

PATENT NO. : 6,292,474 B1
APPLICATION NO. : 09/317660
DATED : September 18, 2001
INVENTOR(S) : Ali et al.

It is certified that error appears in the above-identified patent and that said Letters Patent is hereby corrected as shown below:

Column 9,
Line 15, "generate" should read -- generated --;
Line 41, "from" should read -- form --.

Column 11,
Line 42, "indications of third receive signal" should read -- indications of the third receive signal --.

Column 12,
Line 43, "first receive signal the first receive chain portion" should read -- first receive signal to the first receive chain portion --.

Signed and Sealed this

Twentieth Day of June, 2006

JON W. DUDAS
*Director of the United States Patent and Trademark Office*